March 25, 1947.　　A. DONALD ET AL　　2,418,015
HEATING APPARATUS
Filed July 1, 1944　　2 Sheets-Sheet 1

INVENTORS
ARCHIBALD DONALD
AND JULIUS JACOBSTEIN.
BY Ralph T. French
ATTORNEY

INVENTORS
ARCHIBALD DONALD
AND JULIUS JACOBSTEIN.
BY
Ralph T. French
ATTORNEY

Patented Mar. 25, 1947　　　　　　　　　　　　　　　　　　　　　　　　　2,418,015

UNITED STATES PATENT OFFICE 2,418,015

HEATING APPARATUS

Archibald Donald, Prospect Park, and Julius Jacobstein, Crumn Lynne, Pa.

Application July 1, 1944, Serial No. 543,154

5 Claims. (Cl. 122—32)

1

This invention relates to a method of, and apparatus for, heating; more particularly to binary heaters; and has for an object to provide an improved method and novel apparatus of this character.

Another object of the invention is to provide, in a binary heating system, improved apparatus for heat exchange between the two fluids.

Yet another object of the invention is to provide an improved method of heating by use of a binary system.

A further object of the invention is to provide a binary heating system in which a liquid having a specific heat materially less than that of water is first heated and then is passed in heat transfer relation to a fluid having a specific heat at least as great as that of water, to heat said fluid.

Another object of the invention is to provide water heating apparatus which will be free from precipitation of mineral matter.

Another object of the invention is to provide an improved heating coil for use in heat transfer apparatus.

Yet another object of the invention is to provide heating apparatus having novel means for separating solid particles from the stack gases prior to their leaving the stack.

These and other objects are effected by the invention as will be apparent from the following description and claims taken in connection with the accompanying drawings, forming a part of this application, in which:

Figure 1:
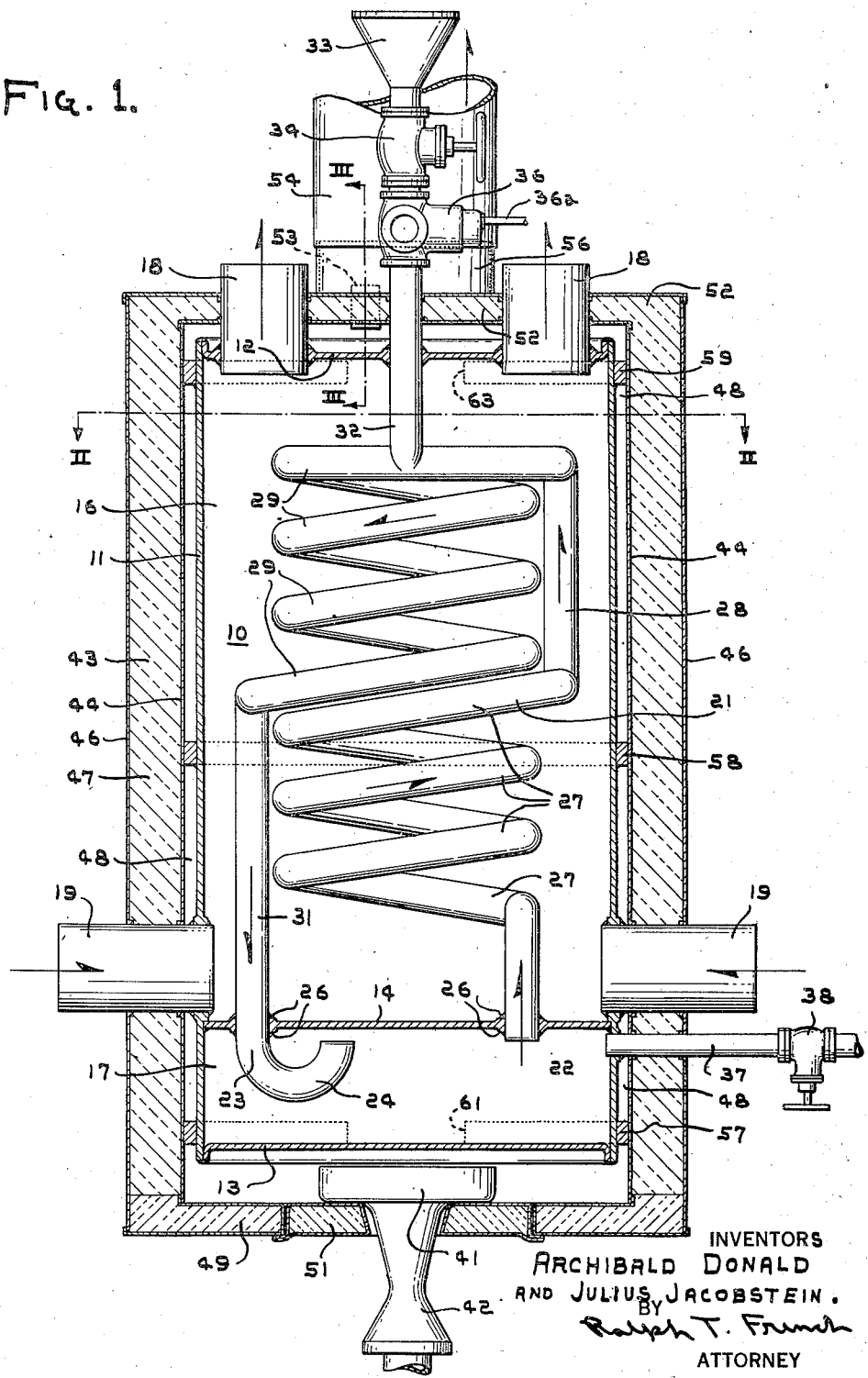
Fig. 1 is a vertical sectional view of heating apparatus constructed in accordance with the present invention.
Figure 2:
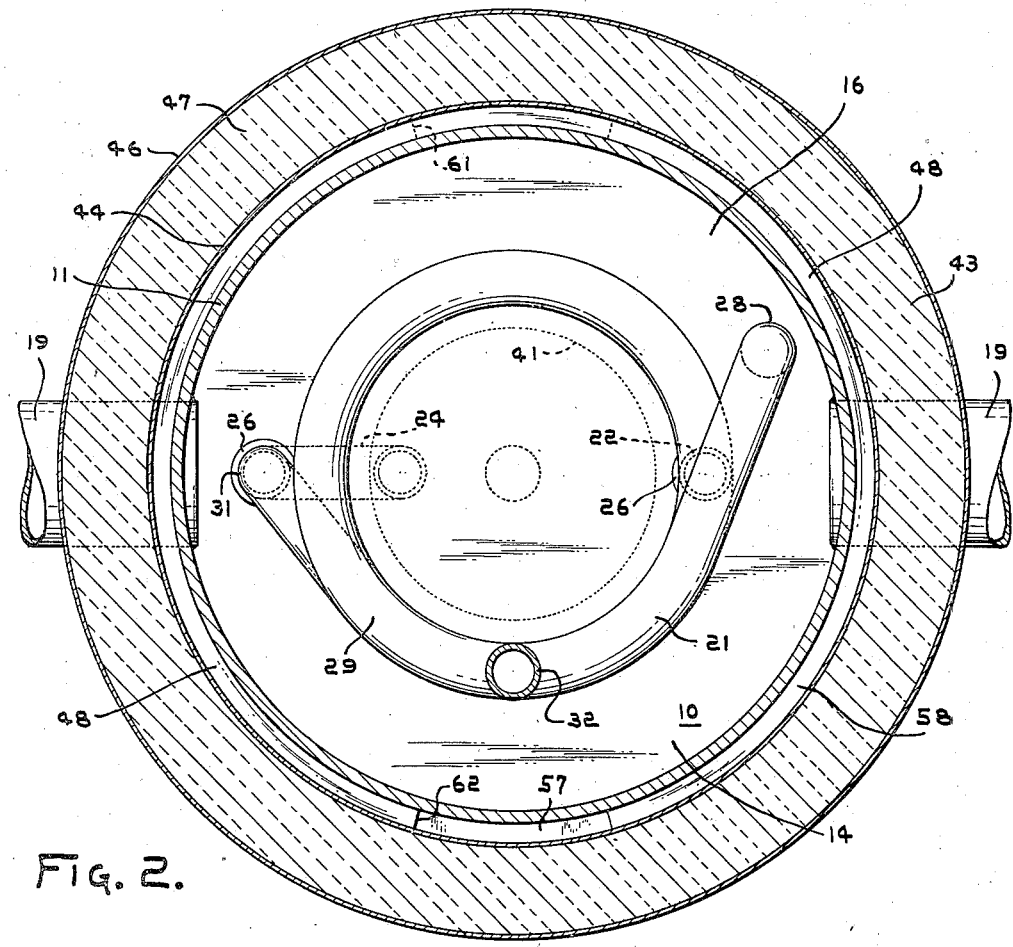
Fig. 2 is a transverse sectional view, taken along the line II—II of Fig. 1, looking in the direction indicated by the arrows.
Figure 3:
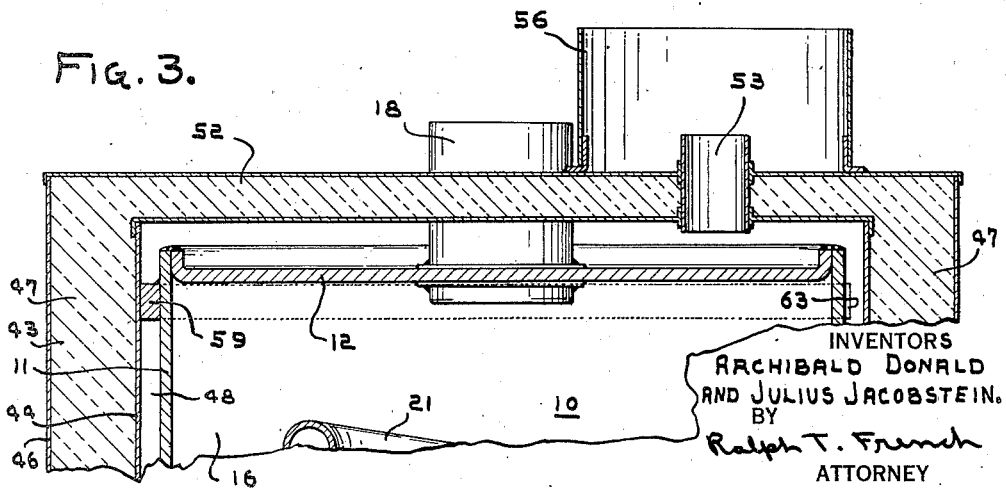
Fig. 3 is a fragmentary, vertical, sectional view, taken along the line III—III of Fig. 1, looking in the direction indicated by the arrows.

Referring now to the drawings more in detail, and particularly to Fig. 1 thereof, the numeral 10 indicates, in its entirety, a binary heater comprising an inner casing 11, preferably of cylindrical form, having upper and lower horizontal end walls 12 and 13, respectively. A horizontal partition 14 separates the interior of the casing 11 into an upper chamber 16 for a liquid to be heated, and a lower chamber 17 for a heat transfer fluid.

In the construction herein illustrated, which is particularly designed for home heating by circulation of a hot fluid, for example, water, therefrom to radiators disposed at suitable locations throughout the building, the upper chamber 16

2 is provided with a pair of outlet or riser connections 18 in the upper wall 12, and a pair of supply or return connections 19 in the side wall 11, near the bottom of the chamber 16. Water heated in the upper chamber, in a manner to be hereinafter described, will flow from the chamber through the outlet connections 18 and through conduits (not shown) to radiators, and then return by other conduits (not shown) to the chamber through the return connections 19, in a manner well known in the art.

A heating coil 21 is positioned in the upper chamber 16, with its inlet end 22 opening downwardly through the partition 14 into the lower chamber 17, and with its outlet end 23 likewise extending through the partition 14, but terminating in a reversely curved portion 24, opening upwardly to the interior of the lower chamber. If desired, the inlet and outlet portions 22 and 23, respectively, of the coil may be permanently secured to the partition 14 where they pass through the latter, by suitable means, such as the weld deposits 26.

The coil 21 is designed for maximum thermal circulation of fluid therethrough, and to this end comprises (considered in the direction of fluid flow therethrough) a first convoluted section 27, a second straight section 28 continuous with and extending beyond the first section, a third convoluted section 29 continuous with and disposed beside the second section, and a fourth straight section 31 continuous with the third section and extending therebeyond and beside the first section.

In order that the lower chamber 17 and the associated coil 21 may be filled with a suitable heat transfer fluid, preferably a liquid having a specific heat materially less than that of water, for example, a mixture of diphenyl and diphenyl-oxide, such as is marketed under the trade name "Dowtherm," the coil is provided, at its highest point, with a branch conduit 32 extending through the top wall 12 of the upper chamber and terminating, externally of the apparatus, in a flared mouth 33 to facilitate filling. A shut-off valve 34 is provided below the mouth 33, and below the valve 34 is a safety or relief valve 36 having an overflow connection 36a with a suitable reservoir (not shown).

A vent pipe 37 and control valve 38 therefor are provided adjacent the uppermost portion of the lower chamber 17, whereby air trapped therein may be removed when the coil and chamber are being filled with the heat transfer fluid.

Heat may be applied to the bottom wall 13 of the lower chamber 17 by the use of any desired fuel, for example, coal, gas, oil or electricity. In the construction herein illustrated, a gas burner 41 directs a flame against the bottom wall 13, and is of such construction that the air necessary for combustion is also supplied to the burner 41 through the body 42 of the latter.

The burner 41 and inner casing 11 are both completely enclosed by an insulated outer casing 43 comprising spaced inner and outer walls 44 and 46, respectively, with insulating material 47 filling the space therebetween. The insulated outer casing 43 is spaced from the inner casing 11 to provide a flow path 48 for waste gases from the burner 41. This space is closed at the bottom by the inwardly-extending radial flange 49 and associated removable closure 51, preventing escape of gases about the burner. The space 48 is closed at the top by the insulated end wall 52, except for the restricted outlet 53 to the stack 54.

It should be noted that the outlet 53 is of much smaller cross-sectional area than the waste gas space 48, and than the stack 54. As a result, the velocity of waste gases greatly increases as they pass through the outlet, with consequent drop in pressure. The sudden change in pressure and velocity as the gases leave the outlet and enter the stack connection 56, causes separation of the solid particles from the gas stream, said particles collecting on the upper surface of the end wall 52, within the stack connection 56, from whence they may be removed periodically. Furthermore, the reduced size of the outlet tends to prevent too rapid a withdrawal of the waste gases from the space 48, thereby providing for optimum rate of flow of the gases past the surface of the inner casing 11 for maximum heat transfer thereto.

In order to bring the waste gases into contact with the maximum area of inner casing surface, a plurality of baffle rings 57, 58 and 59 are positioned in the flow path 48, each ring completely closing the path around the casing except for limited openings 61, 62 and 63 in the rings 57, 58 and 59, respectively. The rings are so arranged that the openings are staggered, openings in adjacent rings being diametrically opposed about the circumference of the inner casing. As a result, the waste gases are forced to flow in a circuitous path in passing from the burner to the stack, and hence contact a maximum area of the inner casing surface, thereby transferring as much as possible of the waste gas heat to the water in the upper chamber 16.

Preferably, the apparatus is so designed that the upper chamber 16 will have a capacity of approximately four times that of the lower chamber 17 and the coil 21 combined. For example, in apparatus for heating a six-room dwelling, and using gas as the fuel, if water and a mixture of diphenyl and diphenyloxide are used in the upper and lower chambers, respectively, the upper chamber should hold about 12 gallons of the water, and the lower chamber and coil should hold about 3 gallons of the mixture.

It will be obvious that in the construction herein illustrated, the concentrated heat from the burner is applied to the heat transfer medium in the lower chamber, and not to the water which might contain minerals which would be precipitated in conventional types of heaters where the water is directly heated. Thus the life of the apparatus is materially increased.

While the invention has been shown in but one form, it will be obvious to those skilled in the art that it is not so limited, but is susceptible of various modifications and changes, as well as other applications, without departing from the spirit thereof, and it is desired, therefore, that only such limitations shall be placed thereupon as are imposed by the prior art or as are specifically set forth in the appended claims.

What is claimed is:

1. In apparatus for heating water, a vertically-disposed tank; partition structure dividing the interior of the tank into an upper chamber for water to be heated and a lower chamber for a heat transfer liquid; a tubular heat exchanger disposed in the upper chamber and having an inlet and an outlet both communicating with the lower chamber, whereby heat transfer liquid in the lower chamber may flow into and through the tubular heat exchanger in a closed circuit; a burner positioned beneath the tank for application of heat to the bottom wall of the lower chamber for heating the heat transfer liquid therein; a casing surrounding the tank at the sides and top and spaced slightly therefrom to provide a flow path for hot gases against the outer surface of the tank; and a stack connection extending upwardly from the casing top wall, said top wall having an opening therethrough of materially lesser cross-sectional area than the stack connection and providing a restricted outlet from the hot gas flow path to said stack connection.

2. In a water heating unit, a tank; a horizontal partition separating the interior thereof into an upper chamber for water to be heated and a lower chamber for a heat-transmitting liquid; a coiled tube extending upwardly from the partition into the upper chamber and having its terminal portions in communication with the lower chamber, whereby heat-transmitting liquid in the lower chamber may circulate through the coiled tube and return to the lower chamber in a closed circuit, said coiled tube comprising a first convoluted section followed by a second straight section both of which extend generally upwardly, a third convoluted section and a fourth straight section, said third and four sections extending generally downwardly and being approximately aligned laterally with the second and first sections, respectively; and means for applying heat to the liquid in the lower chamber.

3. In apparatus for heating water, a vertically-disposed tank; partition structure dividing the interior of the tank into an upper chamber for water to be heated and a lower chamber for a heat transfer liquid; a tubular heat exchanger disposed in the upper chamber and having an inlet and an outlet both communicating with the lower chamber, whereby heat transfer liquid in the lower chamber may flow into and through the tubular heat exchanger in a closed circuit; a burner positioned beneath the tank for application of heat to the bottom wall of the lower chamber for heating the heat transfer liquid therein; a double-walled casing surrounding the tank at the sides and top and spaced slightly therefrom to provide a flow path for hot gases against the outer surface of the tank, the double walls of said casing being spaced apart; insulating material in the space between said double walls; and a stack connection extending upwardly from the casing top wall, said casing top wall having an opening therethrough of materially smaller cross-sectional area than the stack connection and than the hot gas flow path, thereby providing a restricted outlet from the latter to the former.

4. In a water heating unit, a tank; a horizontal partition separating the interior thereof into an upper chamber for water to be heated and a lower chamber for a heat-transmitting liquid; a coiled tube extending upwardly from the partition into the upper chamber and having its terminal portions in communication with the lower chamber, whereby heat-transmitting liquid in the lower chamber may circulate through the coiled tube and return to the lower chamber in a closed circuit, said coiled tube comprising two sections, each section consisting of a convoluted portion and a straight portion, the two convoluted portions being longitudinally aligned, and the straight portion of each section being laterally aligned with the convoluted portion of the other section.

5. In a water heating unit, a tank; a horizontal partition separating the interior thereof into an upper chamber for water to be heated and a lower chamber for a heat-transmitting liquid; a coiled tube extending upwardly from the partition into the upper chamber and having its terminal portions in communication with the lower chamber, whereby heat-transmitting liquid in the lower chamber may circulate through the coiled tube and return to the lower chamber in a closed circuit, said coiled tube comprising a pair of convoluted sections longitudinally aligned about a common axis with the lower end of the lower convoluted section communicating with one terminal of the coiled tube, a straight section providing communication between the upper ends of the two convoluted sections, and another straight section providing communication between the lower end of the upper convoluted section and the other terminal of the coiled tube.

ARCHIBALD DONALD.
JULIUS JACOBSTEIN.

REFERENCES CITED

The following references are of record in the file of this patent:

UNITED STATES PATENTS

| Number | Name | Date |
| --- | --- | --- |
| 2,024,508 | Carroll | Dec. 17, 1935 |
| 569,637 | Gold | Oct. 20, 1896 |
| 2,007,426 | Harris | July 9, 1935 |
| 1,944,894 | Kennedy | Jan. 30, 1934 |
| 2,014,135 | Kamenetzky | Sept. 10, 1935 |
| 1,862,065 | Rowe | June 7, 1932 |
| 2,151,108 | Hultgren | Mar. 21, 1939 |
| 762,541 | Long | June 14, 1904 |
| 1,937,335 | Foley | Nov. 28, 1933 |
| 2,162,337 | Kriechbaum | June 13, 1939 |
| 2,242,588 | McGrath | May 20, 1941 |

FOREIGN PATENTS

| Number | Country | Date |
| --- | --- | --- |
| 559,201 | German | Sept. 17, 1932 |